United States Patent [19]

Frayer

[11] Patent Number: 4,624,978
[45] Date of Patent: Nov. 25, 1986

[54] HIGH TEMPERATURE POLYIMIDE PROCESSING AID

[75] Inventor: Paul D. Frayer, Brooklyn, Conn.

[73] Assignee: Rogers Corporation, Rogers, Conn.

[21] Appl. No.: 728,480

[22] Filed: Apr. 29, 1985

Related U.S. Application Data

[63] Continuation-in-part of Ser. No. 550,784, Nov. 14, 1983, abandoned.

[51] Int. Cl.$^4$ .......................... C08K 5/34; C08L 79/08
[52] U.S. Cl. ...................................... 524/104; 524/600
[58] Field of Search ................................. 524/104, 600

[56] References Cited

U.S. PATENT DOCUMENTS

| | | | |
|---|---|---|---|
| 4,470,944 | 9/1984 | Asakura | 524/104 |
| 4,495,321 | 1/1985 | Arnold | 524/104 |
| 4,515,915 | 5/1985 | Uda | 524/104 |

*Primary Examiner*—C. Warren Ivy
*Attorney, Agent, or Firm*—Fishman & Dionne

[57] ABSTRACT

A high temperature processing aid for melt processing polyimide polymers and a method of doing same is presented wherein a compatible, high boiling point N-alkyl- or N-alicyclic-substituted pyrrolidone is added to a polyimide polymer in amounts sufficient to lower the glass transition temperature of said polyimide.

12 Claims, No Drawings

HIGH TEMPERATURE POLYIMIDE PROCESSING AID

BACKGROUND OF THE INVENTION

As is known, the melt processing of highly aromatic polyimides is extremely difficult in that one usually experiences degradation of the polymer since its softening temperature exceeds its thermal stability. Such polyimides may include homopolymers and copolymers such as polyamide-imides, polyester-imides, polyimide amide-imides and the like as well as blends of such polyimides providing they are sufficiently linear to be melt processed.

By definition, melt processing means the application of pressure and temperature for some time period to cause a thermally plasticized polymer to flow. It will be appreciated that melt processing can be aided by addition of a compatible physical plasticizer to increase flow at the same temperature.

Accordingly, it is an object of the present invention to provide a non-reactive, compatible, high temperature melt processing aid as a physical plasticizer for rendering predominantly linear aromatic polyimides melt processible.

It is another object of the present invention to provide a processing aid for predominantly linear polyimides which is inexpensive to use and is applicable to injection molding, extrusion, and compression molding techniques.

The above and other objectives and advantages of the present invention will be more readily understood when considered in light of the following discussion.

As is known in the art, the processing of polyimides is difficult in that, in general, polyimides have a relatively narrow processing temperature window. In other words, the softening temperature and the temperature at which thermal degradation takes place are relatively close. As a rule of thumb, it has been suggested that for processing amorphous polymers the melt temperature should be in the range of Tg+80° to 100° C. for compression molding, Tg+100° to 125° C. for screw extrusion and Tg+125° to 150° C. for injection molding. Since thermal instability of polyimides begins to occur at about 375° C., depending on time of exposure, polyimides having a Tg above about 275° C. cannot be melt processed by the more common methods of extrusion and injection molding.

As an example of the above, a polyimide sold commercially as PI-2080 by UpJohn Corporation has an atmospheric pressure Tg of about 310° C. and continuous use temperature limit of about 260° C. (The composition of PI-2080 is fully disclosed in U.S. Pat. No. 3,708,458 and a paper entitled MOLDED COMPOSITES FROM POLYIMIDE 2080 presented at the 4th National SAMPE Technical Conference on Oct. 17–19, 1972 in Palo Alto, California). In that as a rule, the maximum processing temperature has been found to be only 370° C., commercial products (solid shapes) based on PI-2080 are presently made by atypical, time consuming processing methods such as:

1. low pressure compression molding with cycle times of many hours,
2. ram extrusion at fractional rates of normal polymer profile screw extrusion rates, and
3. sintering of high pressure, low temperature formed shapes analogous to powder metallurgy.

In each case, high viscosity prevents fast processing.

In the present invention, thermal stabilizers in amounts of from 0.25% to about 5.0% by weight are optionally used to increase the maximum temperature for processing so as to further reduce the viscosity by thermal plasticization and to physically plasticize the polyimide with a high boiling point, compatible fluid which serves as a physical plasticizer. Preferably, such stabilizers are of high molecular weight and low volatility. Examples of useful thermal stabilizers are the hindered amine types such as Naugard 445 by Uniroyal Corp, phosphite types such as Naugard PHR by Uniroyal Corp, and the phenolic types such as Goodrite 3114 by B. F. Goodrich Corp. In this regard, stabilizer and plasticizer compatability are important for polymer viscosity reduction (degradation increases viscosity) and for increasing the inherent boiling point of the plasticizer within the polyimide matrix. The final Tg of the polymer/plasticizer/stabilizer system depends especially on the quantity of plasticizer remaining which is a function of processing history. A compatible physical plasticizer is one that lowers the Tg of the polyimide. Preferably, the final Tg should be above the continuous use temperature limit which, for example, is about 260° C. for PI2080. The continuous use temperature limit is that temperature at or below which the polyimide (or a composite based on the polyimide) can be used continuously without loss of properties, for example due to thermal or thermo-oxidative degradation over a time period of a year or more. (A property half-life after 10,000 hrs exposure is commonly used). Highly aromatic polyimides are generally thermally stable for short time exposures (e.g. 100 hours) to elevated temperatures above their continuous use temperature limits (e.g. 20° C. higher).

While thermal stabilizers do, in fact, broaden the processing window for polyimides, they do not, by themselves, permit fast polyimide processing in that even at 410° C. the viscosity of the polymers are about two orders of magnitude too high.

In order to meet the desired processing temperature and avoid thermal degradation, it has been found that the addition of a compatible, high boiling point N-alkyl- or N-alicyclic-substituted pyrrolidone as defined herein plasticizes the polyimide and allows the depression of the Tg of the polyimide so as to permit melt processing thereof without causing excessive gaseous release of the solvent. Thus, such a physical plasticizer, while aiding in processing, does not substantially reduce the key properties of the polyimide polymer at room temperature or at temperatures up to the continuous use temperature limit. The boiling point of the physical plasticizer should be above the continuous use temperature limit for the polyimide.

With regard to the above, it has been found that compatible, high boiling point N-alkyl- or N-alicyclic - substituted pyrrolidones such as N-cyclohexyl-2-pyrrolidone (CHP) and N-methyl diaminopropyl pyrrolidone (DMAPP) when employed with a polyimide do, in fact, depress the Tg of the polymer to such a point as to permit melt processing without thermal degradation, i.e. compatible, physical plasticizers.

In the present invention, the term polyimide is meant to include homopolymers and copolymers such as polyimide-imides, polyamide-imides, polyester-imides, polyimide-amide-imides and the like as well as blends of such polyimides providing they are sufficiently linear so as be melt processed, crosslinking possibly occurring subsequent to shaping.

Further, it has been found that the amount of compatible high boiling point physical plasticizer to be used should be from about 1% to about 10% by weight, preferably from about 3% to about 10% by weight.

The following examples are given to further illustrate the present invention.

In order to demonstrate the effect of the pyrrolidones on the Tg of polyimides, a series of differential scanning calorimetry (DSC) tests were made on the polyimide polymer PI-2080 manufactured by UpJohn Corporation which as been modified in the following ways:

a. By the addition of 3%, 5% and 10% by weight of N-cyclohexyl-2-pyrrolidone (CHP) solvent;
b. by the addition of 3% by weight of N-methyl diaminopropylpyrrolidone (DMAPP);
c. by the addition of 3% by weight N-cyclohexyl-2-pyrrolidone plus 10% by weight dimethyl formamide;
d. by the addition of 3% by weight N-cyclohexyl-2-pyrrolidone plus a thermal stabilizer and a heat cycle.

In this testing, all samples of the PI2080 polyimide were prepared using dimethylformamide and/or acetone as a volatile diluent for the addition of the solvent to aid dispersion into the polymeric powder. Accordingly, about 10 grams of powder and an equal amount of acetone were mixed to which was added the appropriate amount of additive which was also reduced with an equal amount of acetone. The mixture was placed in a hood and allowed to stand overnight to allow the acetone to evaporate and to allow the additive to diffuse into the polymer powder particles. The heating rate for the DSC was 10° C./minute. The normal boiling point of dimethylformamide (DMF) is relatively low compared to the pyrrolidones, 155° C. vs about 284° C. for CHP. Thus, drying at elevated temperature near or above the boiling point of the DMF but below the boiling point of the pyrrolidone effectively removes the DMF. Interactions between the pyrrolidones and polyimides have been found to increase the effective boiling point of the pyrrolidone which then allows a higher processing temperature for the polyimide.

| Example No. | Tg (°C.) |
|---|---|
| 1. PI-2080 | 305–310 (as received) |
| 2. PI-2080, 10% CHP Air dried | 245 |
| 3. PI-2080, 3% CHP Air dried | 255 |
| 4. PI-2080, 3% DMAPP Heated and cooled | 270 |
| 5. PI-2080, 3% CHP Oven dried | 290 |
| 6. PI-2080, 3% CHP Dried @ 200° C. | 300 |
| 7. PI-2080, 3% CHP Dried @ 250° C. | 300 |
| 8. PI-2080, 5% CHP Dried @ 250° C. | 300 |
| 9. PI-2080, 3% CHP 1.0% stabilizer Dried @ 250° C. | 300 |
| 10. PI-2080, 3% CHP 10% DMF | 220 |
| 11. PI-2080, 3% CHP Dried 1 hr @ 105° C. | 265 |
| 12. PI-2080, 3% CHP 10% DMF | 295 |

-continued

| Example No. | Tg (°C.) |
|---|---|
| Dried 1 hr @ 200° C. | |

From the DSC testing in general and from the chart given above, it is noted that the pyrrolidones effectively reduce the Tg of the polyimide polymers and the amounts used determines the Tg which can range from about 220° C. to 300° C.

The following examples are provided to show the value of depressing the Tg of a polyimide with a compatible pyrrolidone plasticizer so that the polyimide may be melt processed; e.g., compression molded in a short time relative to the polyimide without a physical plasticizer under the same conditions.

In the following examples, PI-2080 polyimide in powder form was molded at three different temperatures to obtain some measure of the processing window as judged by the amount of flow. Additionally, samples containing 3% and 10% N-cyclohexyl-2-pyrrolidone which was added before molding were also prepared. In each case, the powder was compression molded between Kapton film release sheets and sandwiched between steel plates.

In each test sample, the results of which are summarized below, a sample of about 6 grams were used and the molding temperature was reached generally in less than 15 minutes under a ram load force 10,000 lbs.

| Exam. # | % CHP | Temp °C. | Area/In$^2$ | Press/ PSI | Flowability In 2/1000 PSI |
|---|---|---|---|---|---|
| 12 | 0 | 327 | 0.859 | 11640 | 0.0738 |
| 13 | 3 | 327 | 1.473 | 6790 | 0.217 |
| 14 | 0 | 383 | 5.30 | 1887 | 2.81 |
| 15 | 3 | 383 | 5.71 | 1750 | 3.26 |
| 16 | 10 | 383 | 8.30 | 1205 | 6.88 |
| 17 | 0 | 411 | 4.91 | 2037 | 2.41 |
| 18 | 3 | 411 | 4.31 | 2318 | 1.86 |
| 19 | 10 | 411 | 5.41 | 1848 | 2.93 |

As will be noted from the above, the presence of the N-cyclohexyl-2-pyrrolidone improves the flowability of the polyimide polymer during compression molding. Further, as the content of the CHP is increased at constant temperature, flowability is also increased. Processing at too high a temperature may cause a decrease in flowability due to degradation.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A melt processible composition comprising a polyimide and at least one compatible physical plasticizer, said Physical plasticizer comprising a N-alicyclic-pyrrolidone having a boiling point above the continuous use temperature limit for the polyimide wherein said compatible physical plasticizer is present in an amount sufficient to lower the glass transition temperature of said polyimide during processing of said polyimide.

2. The composition of claim 1 wherein said N-alicycli-pyrrolidone is N-cyclohexyl-2-pyrrolidone.

3. The composition of claim 1 further including a thermal stabilizer.

4. The composition of claim 3 wherein said thermal stabilizer is present in an amount of from about 0.25% to about 5% by weight.

5. The composition of claim 3 wherein said thermal stabilizer is selected from the group consisting of amines, phosphites or phenolics.

6. The composition of claim 1 wherein said amount of physical plasticizer is from about 1% to about 10% by weight of the total weight of the melt processible composition.

7. A method of preparing polyimide polymers for melt processing comprising combining said polyimide polymer with at least one compatible physical plasticizer, said physical plasticizer comprising a N-alicyclic-pyrrolidone in an amount sufficient to lower the glass transition temperature of said polyimide polymer, said compatible plasticizer having a boiling point above the continuous use temperature limit for the polyimide.

8. The method of claim 7 wherein said N-alicyclic-pyrrolidone is N-cyclohexyl-2-pyrrolidone.

9. The method of claim 7 wherein a thermal stabilizer is combined with said polyimide and said compatible physical plasticizer.

10. The method of claim 9 wherein said thermal stabilizer is selected from the group consisting of amines, phosphites and phenolics.

11. The method of claim 9 wherein said thermal stabilizer is present in an amount of from about 0.25% to about 5% by weight.

12. The method of claim 7 wherein said compatible physical plasticizer is present in an amount of from about 1% to about 10% by weight of the total weight of the melt processible composition.

* * * * *